June 30, 1942.  E. C. KOPP  2,288,245
OIL AND GAS SEPARATOR
Filed Jan. 9, 1940   3 Sheets-Sheet 1
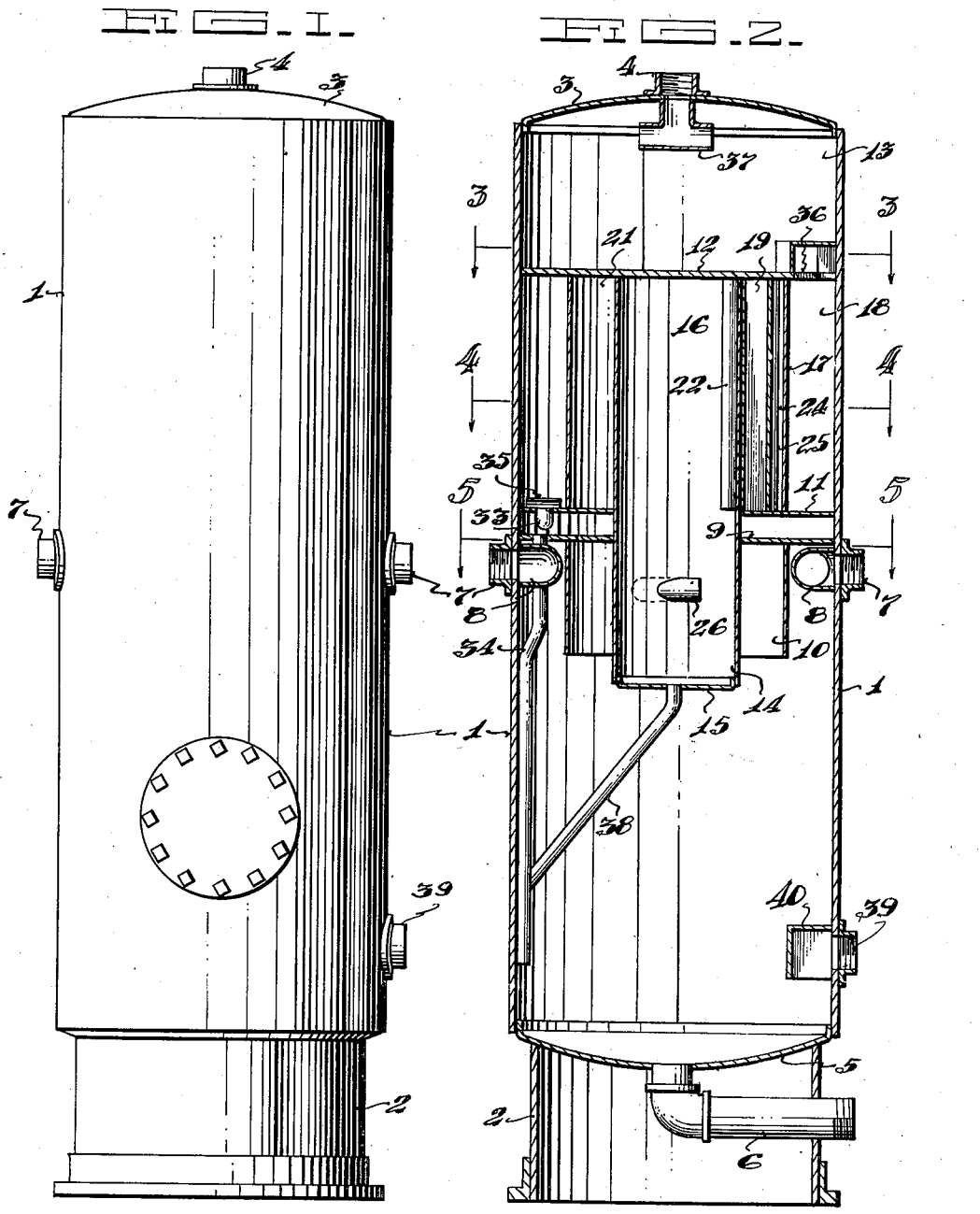
Edward C. Kopp,
INVENTOR.
BY Cecil L. Wood
Attorney.

June 30, 1942.  E. C. KOPP  2,288,245
OIL AND GAS SEPARATOR
Filed Jan. 9, 1940   3 Sheets-Sheet 2
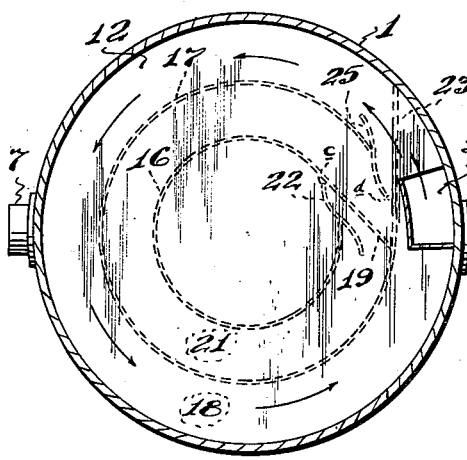
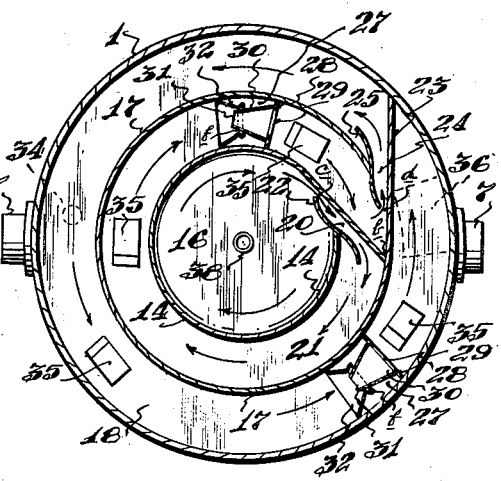
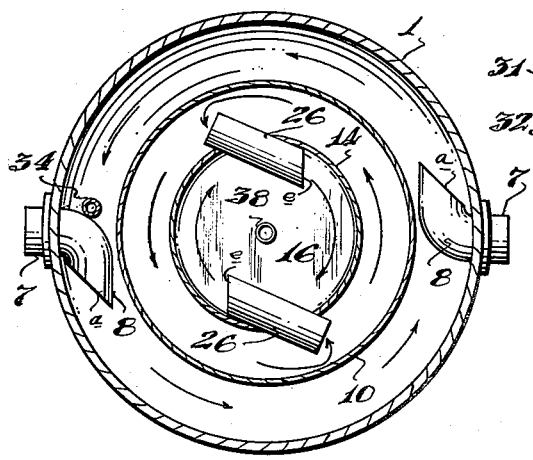
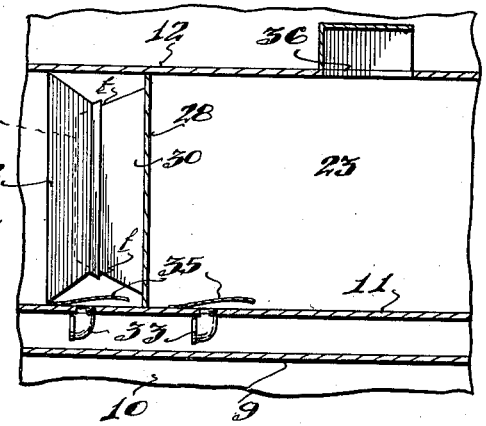
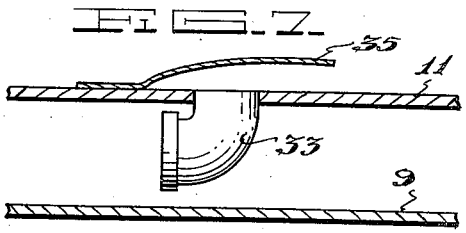
Edward C. Kopp,
INVENTOR
BY Cecil L. Wood
Attorney

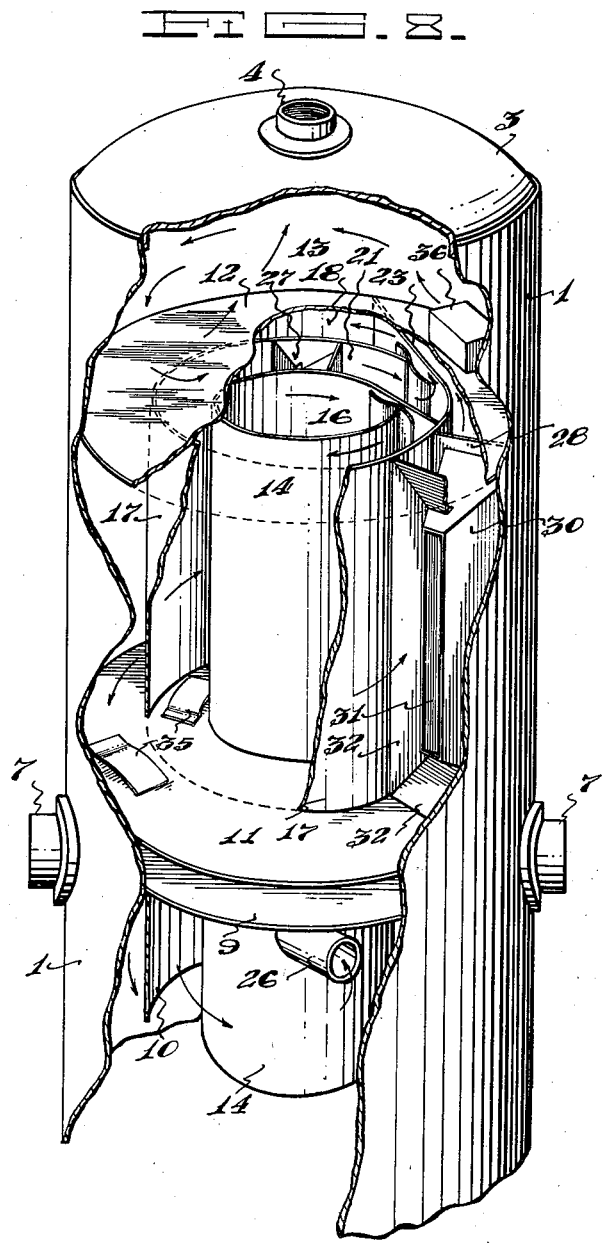

Patented June 30, 1942

2,288,245

UNITED STATES PATENT OFFICE 2,288,245

OIL AND GAS SEPARATOR

Edward C. Kopp, Fort Worth, Tex.

Application January 9, 1940, Serial No. 313,045

1 Claim. (Cl. 183—2.7)

This invention relates to oil and gas separators of the type employed for the treatment of fluids, such as oil, by introducing the influent comprising oil and gas which is ordinarily flowed directly from the well into a container embodying a series of baffles and compartments affording a means of liberating gases from the oil by a scrubbing process, and its principal object resides in the provision of a method including apparatus capable of effecting such separation by the introduction of the influent under pressure direct from the well into a container in a spiral or circular motion and conducting the combination through a series of baffles and channels to subject the influent to a scrubbing action tending to break down the gaseous component and separate the latter from the heavier oil constituents which are deposited in the lower portion of the container and subsequently delivered to storage.

Another object of the invention resides in the provision of a method and apparatus whereby the maximum separation of gaseous constituents from newly produced petroleum can be accomplished by subjecting the product to severe turbulence and extensive scrubbing action to liberate all of the lighter constituents from the product, allowing the gaseous particles to be discharged in a substantially dry state while salvaging the maximum of oil from the influent and delivering the same to storage substantially free of the lighter volatile constituents.

Broadly, the invention seeks to comprehend the provision of a method and apparatus for carrying out such method which includes an assembly of elements capable of breaking down and dividing out the gaseous particles of the influent combination in the most economical manner permitting the heavier or oil constituents to be delivered to storage without the more volatile constituents which are conducted upwardly and thence to storage or otherwise disposed of.

While the foregoing objects are paramount, other and lesser objects will become manifest as the description proceeds taken in connection with the appended drawings wherein:

Figure 1 is an elevational view of the apparatus forming a part of the invention.

Figure 2 is a vertical cross-sectional view of the apparatus.

Figure 3 illustrates a plan view of the uppermost deck taken on lines 3—3 of Figure 2 illustrating the gas discharge outlet into the discharge chamber thereabove.

Figure 4 shows a lateral cross-section taken on lines 4—4 of Figure 2 illustrating an arrangement of baffles and restricted passages in the concentric arrangement of annular compartments or raceways.

Figure 5 is a lateral cross-section taken on lines 5—5 of Figure 2 showing the inlet diverters and the tangential inlets in the lowermost end of the innermost compartment.

Figure 6 is a fragmentary illustration of one of the baffled restricted ports in one of the annular passages and showing the gas outlet in the topmost deck.

Figure 7 is a fragmentary illustration of one of the shielded drains in the lowermost deck, and Figure 8 is a perspective fragmentary illustration of the apparatus showing portions cut away to illustrate the internal arrangement of concentric cylinders and passages as well as the horizontal decks and indicating by arrows the passage of the influent therethrough.

The apparatus herein described is designed in some respects similarly to the device shown and described in applicant's Patent No. 2,163,095, dated June 20, 1939, and some of the features herein disclosed appear in said Letters Patent. It is pointed out, however, that the instant disclosure includes a novel method for treating the influent to effect a satisfactory separation of the constituents as the same are passed through the apparatus.

The preferred form of apparatus for carrying out the method herein described consists primarily of a container 1 in the form of a tank having a base 2 and preferably a dome top 3 in the center of which is provided a gas outlet 4. The bottom 5 of the tank 1 is also preferably concave and a drain outlet 6 is connected therein, as shown in Figure 2, which passes through the small compartment formed within the base 2.

Inlets 7 are arranged in each side of the container 1, as shown particularly in Figures 2 and 5, over which are provided diverters 8 formed preferably of tubing at approximately a 90° angle and directed parallel with the walls of the tank 1, as shown in Figure 5, and having their outlet ends a beveled to approximately 45° to direct the influent against the inner circular walls of the tank 1, in a manner to be hereinafter described. A horizontal deck or floor 9 is arranged immediately above the inlets 7 and the diverters 8 and a cylindrical baffle 10 depends therefrom and extends downwardly a substantial distance below the diverters 8, as shown in Figures 2 and 8. Another floor or deck 11 is arranged parallel with and a short space above the deck 9 providing a shallow chamber or compartment between these members. This arrangement is also illustrated in Figures 6 and 7. Another deck 12 is disposed near the top of the tank 1 above which is formed a gas discharge chamber 13 in the upper portion of the container 1.

Concentrically arranged within the tank 1 is a central cylinder 14 having a closure 15 at its lowermost end and closed at its uppermost end by the deck 12 forming a primary chamber 16. The cylinder 14 extends through both of the decks 9 and 11 and depends below the lowermost end of the cylindrical baffle 10 and forms an annular space therein, as illustrated particularly in Figure 2, through which the influent must pass upon entering the chamber 16 in the manner which will be hereinafter described.

Another cylinder 17 is concentrically arranged between the cylinder 14 and the inner walls of the tank 1 and extends vertically between the decks 11 and 12, the latter members serving to close the upper and lower ends of the chamber formed between the cylinders 14 and 17, and such arrangement results in the provision of yet another chamber 18 between the inner wall of the tank 1 and the cylinder 17.

Referring to Figure 4, it will be noted that above the deck 11 a partition 19 extends tangentially from the inner cylinder 14 and joins the wall of the cylinder 17 at $b$ and an elongated vertically arranged passage 20 forms a communication between the primary chamber 16 and the chamber 21 between the walls 16 and 17. A baffle 22, substantially S-shaped in lateral cross-section, is arranged within the elongated opening 20 restricting the same at $c$, in the manner illustrated in Figure 4, and whose function will be presently described.

Another vertical partition 23 extends tangentially from the wall of the cylinder 17 in a manner similar to that of the member 19, which serves to partition the outer chamber 18 and at once provide for the reversal of the flow of influent through the apparatus by providing another elongated vertical communication 24 between the compartments 17 and 21.

Another vertically arranged baffle 25, substantially S-shaped in cross-section, and similar to the baffle 22, is arranged within the communication 24 in such a manner as to restrict the passage at $d$ in a similar manner to the restriction $c$ in the opening 20.

As the influent is introduced into the tank 1 it is directed circumferentially around the wall of the latter by the diverters 8 and the heavier constituents are deposited in the bottom of the container 1 after contacting the cylindrical baffle 10 while the liberated gaseous constituents are passed upwardly in the same helical course within the baffle 10 and conducted into the primary chamber 16 through tangentially disposed conductors 26 in the lower portion of the cylinder 14 within the baffle 10, as illustrated in Figures 2 and 5. The conductors 26 are directed oppositely from the diverters 8 and thus effect an abrupt reversal in the spiral course of the constituents which, as illustrated by the arrows in Figures 5 and 8, is introduced in an anti-clockwise movement but upon entering the chamber 16 is reversed.

The conductors 26 are oppositely arranged preferably on each side of the cylinder 14 and while their outer ends are squared the discharge ends $e$ are preferably beveled in order to direct the influent toward the circular walls of the chamber 16 and conduct the constituents upwardly and helically toward and through the restriction $c$, past the baffle 22 in the opening 20 and into the circular raceway or channel 21 externally of the chamber 16 in the direction of the arrows shown in Figures 4 and 5.

In the path of the influent circulating through the raceway or channel 21 is positioned a baffling arrangement 27 consisting of a partition 28 having a vertically elongated port 29 therein, the latter being provided with a hood 30 having inclined walls, as illustrated in Figures 6 and 8, terminating in an elongated opening 31 providing a restricted passage for the influent and baffling the same. A shield or baffle 32 is arranged around the opening 31 in the hood 30 and is formed in such a manner as to direct the influent inwardly toward the opening 31 by its inwardly converging walls which terminate in close relationship with the opposingly inclined walls of the hood 30 and provide a substantially narrow space $f$ entirely around between the inner restricted perimeter of the baffle 32 and the hood 30, admitting the passage of a certain amount of the influent therethrough.

Thus, as the gaseous constituents, in their passage through the channel 21, pass through the baffle assembly 27 a certain amount of oil may be segregated therefrom and allowed to drain to the deck 11 and thence through conductors 33 on to the lowermost deck or oil pan 9 and thence to the lower end of the container 1 through a drain tube 34 extending through the deck or oil pan 9.

Each of the drain conductors 33 is preferably directed rearwardly of the path of the influent, as shown in Figure 6, and provided with shields 35 arranged along the surface of the deck 11 and extending over the drain conductors 33 to prevent a suction through the drain conductors occasioned by the rapid movement of the influent along the raceways 21 and 18. It is desirable to arrange such an assembly on each side of the partition 28 at each of the baffling assemblies 27, the first of which is arranged beneath the shield 32 in front of the partition 28 while the second is preferably arranged immediately behind the partition 28, as illustrated in Figure 6.

A similar baffling arrangement 27 is positioned in the path of the influent near the end of the outer raceway 18, as shown in Figure 4, and is also provided with the drain conductors 33 with their shields 35 arranged in the same manner as those previously described and illustrated in Figure 6. The last baffling assembly 27 is positioned near the louvered outlet 36 in the uppermost deck 12 through which the gases are discharged helically into the discharge chamber 13 and are allowed to pass out through a substantially inverted T-shaped baffle 37 and the outlet 4 in the top 3 of the tank 1.

It is desirable to position others of the drain conductors 33 and the shields 35 therefor at spaced intervals along each of the raceways 18 and 21, as illustrated in Figure 4.

As the liberated gases are conducted into the primary chamber 16, in the manner previously described, much of the oil will be separated therefrom within the chamber 16 and permitted to drain to the bottom of the tank 1 through the drain tube 38 in the bottom 15 of the cylinder 14, particularly upon coming in contact with the baffle 22 within the opening 20 between the primary chamber 16 and the raceway 21. The oil separated from the gases passing into the raceways 21 and 18 is allowed to pass through the drain conductors 33 on to the pan 9 and thence downwardly through the drain tube 34 to the bottom of the tank 1.

The influent, being introduced under pressure, moves rapidly in a helical course and, by reason of the restricted passage c in the opening 20 between the chamber 16 and the raceway 21, a jetting effect is accomplished whereby much of the oil is dissipated from the gas. The turbulence and agitation thus created is enhanced by the baffling assembly 27 in the raceway 21 and by the abrupt reversal of the circular motion of the influent as the same is jetted through the restricted passage d in the opening 24 between the raceway 21 and the channel 18 thereby liberating an additional quantity of the oil from the gases.

A final scrubbing is accomplished by the baffle assembly 27 in the channel 18 just before the gases are discharged upwardly and helically through the discharge chamber 13. It is desirable to continue the circular and helical movement of the gases upwardly through the discharge chamber in order to subject the same to a maximum scrubbing operation. The oil deposited in the lower portion of the container 1 is delivered to storage through the outlet 39 which is provided with a hood 40, as shown in Figure 2.

While the foregoing description is directed to a preferred form of the invention and seeks to convey a comprehensible design and application of the invention, certain changes and modifications may be resorted to without departing from the spirit and intent of the invention provided such changes and modifications fall within the scope of the appended claim.

What is claimed is:

In an oil and gas separator comprising a tank having an oil and gas inlet and outlets and diverters at the said inlets, multiple horizontal decks arranged in the said tank forming a gas outlet chamber in the top of the said tank, a central compartment and an oil pan, a cylindrical primary chamber arranged in the said tank and adapted to depend below the lowermost of the said decks and having its bottom closed, a cylindrical baffle surrounding the lower end of the said primary chamber in the vicinity of the said diverters, tangential inlets in the said chamber within the said baffle, a cylindrical partition defining concentric chambers having narrow vertical communications therebetween arranged in the said central compartment and having vertical baffles positioned in each of the said communications restricting the same, each of the said baffles being curved laterally of their longitudinal axes, and a louvered communication between the outermost of the said channels and the said gas outlet chamber.

EDWARD C. KOPP.